United States Patent [19]
Stoumen et al.

[11] Patent Number: 5,893,360
[45] Date of Patent: Apr. 13, 1999

[54] INFLATABLE SOLAR OVEN

[76] Inventors: O'Malley O. Stoumen; Jonathan A. Stoumen, both of 614 Johnson St., Healdsburg, Calif. 95448

[21] Appl. No.: 08/824,126
[22] Filed: Mar. 25, 1997
[51] Int. Cl.$^6$ .................. F24J 2/02; F24J 2/10
[52] U.S. Cl. .................. 126/714; 126/624; 126/682
[58] Field of Search .................. 126/704, 697, 126/681, 682, 624, 625, 626, 714, 565, 566, 561, 680, 569

[56] References Cited

U.S. PATENT DOCUMENTS

| 1,928,703 | 10/1933 | Rubin. | |
|---|---|---|---|
| 3,153,878 | 10/1964 | Smith, Jr. | 126/569 |
| 4,126,123 | 11/1978 | Hall | 126/625 |
| 4,520,793 | 6/1985 | Hall | 126/626 |
| 4,672,389 | 6/1987 | Urly | 343/915 |
| 4,924,919 | 5/1990 | Oyler. | |
| 5,041,046 | 8/1991 | Nakamura et al. | |
| 5,117,344 | 5/1992 | Perez. | |

OTHER PUBLICATIONS

WO 85002457, Eriksson, "Container for the Heating and Storage of Liquid", Jun. 1985.

Primary Examiner—Carl D. Price
Attorney, Agent, or Firm—Owen, Wickersham & Erickson

[57] ABSTRACT

An inflatable solar oven is comprised of two sheets of flexible material which are sealed at their edges to form an enclosure. The top sheet is clear and the bottom sheet has a reflective layer. The two sheets can be inflated to form a spherical enclosure by passing air through an edge opening that is also large enough to access a water or food holding receptacle which can be placed with the inflated enclosure. Extended portions of the sheets that form the opening can be rolled up to form a closure for it. The inflated enclosure can be secured to the ground in an appropriate position to receive the sun's rays which pass through the clear sheet and reflect from the bottom sheet to heat the receptacle therein.

8 Claims, 2 Drawing Sheets

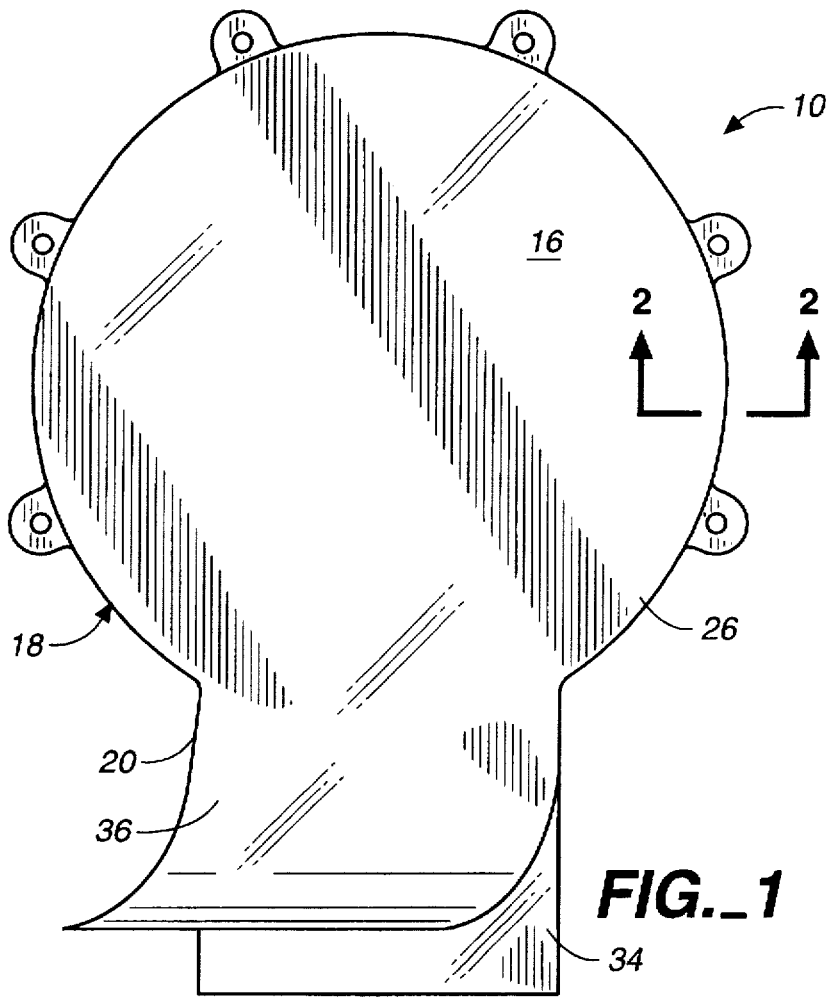
FIG._1
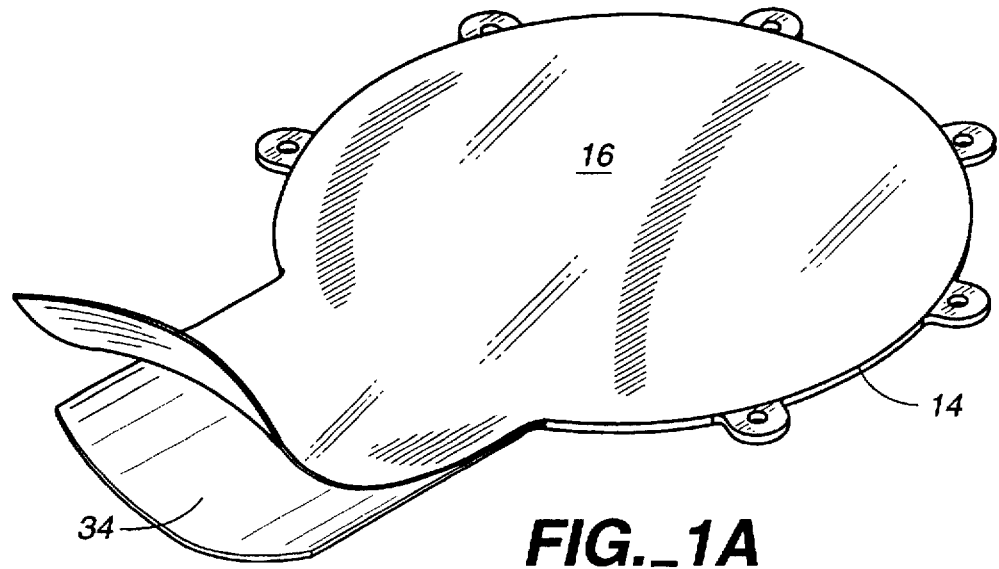
FIG._1A

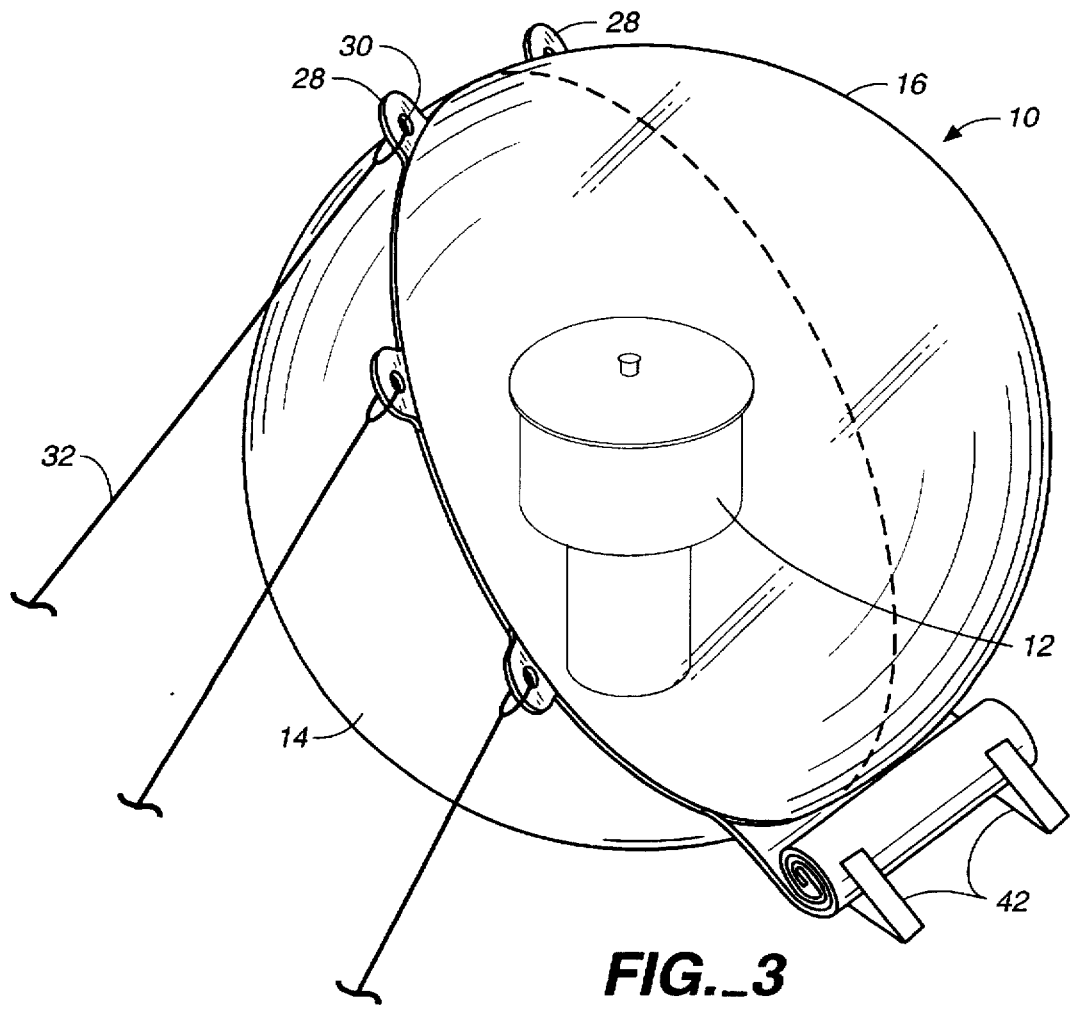

5,893,360

1

INFLATABLE SOLAR OVEN

FIELD OF INVENTION

This invention relates to solar ovens or cookers, and more particularly to an inflatable, lightweight and portable solar cooker.

BACKGROUND OF THE INVENTION

Although various solar devices that utilize the sun's rays to provide heat for cooking have been previously devised, most such devices were comprised of rigid reflective components which had to be assembled into a predetermined geometric shape and retained by suitable fastening means. Also, such prior devices even though portable, were bulky and relatively heavy and thus not practical for many uses. Weight and space are critical factors to hikers and backpackers and there has long been a need for an efficient solar oven device with such features which would enable the user to hike in and out of an area without the need to carry a heavy stove and fuel containers. In addition, persons in remote or underdeveloped areas such as in refugee camps or third world countries where fuel is costly or unavailable have found a need for a relative simple means for utilizing solar energy for cooking or heating food or water. Also, emergency craft such as lifeboats can readily utilize a solar device for heating food or water that can be easily stored.

An inflatable, reflective solar oven is shown in U.S. Pat. No. Design 310,657, but this patent does not disclose the present invention and appears to be impractical for the use that its title implies. For example, it fails to show or teach how a food or water holder or any form of cooker could be placed within the oven shown to provide the intended cooking or baking function. Further, this patent discloses no details of construction or procedures for using the device as a solar oven. The present invention solves these problems.

SUMMARY OF THE INVENTION

Accordingly, it is a general object of the invention to provide a solar oven made of flexible material which can be folded into a small, relatively light package and yet can be inflated for use to expose a large, concave reflective surface that will direct the sun's rays upon a container for food or water that is to be cooked or heated.

Another object of the invention is to provide an envelope of flexible material comprised of a layer of reflective material and a transparent plastic sheet which can be inflated to form an air-filled enclosure that has a relatively wide but sealable opening on one side that facilitates the insertion and removal of a cooking container within the envelope.

Another object of the invention is to provide a flexible, collapsible solar oven comprised of selected components which can be heat sealed together to form an envelope enclosure for a cooking container or the like.

Still another object of the invention is to provide a flexible, inflatable solar heating device that is particularly well adapted for ease and economy of manufacture.

In one preferred embodiment of the invention a first layer of material having a reflective surface is covered by a second layer of transparent plastic material. The two layers are generally circular, and a tongue-like member for each layer extends from one side. At predetermined spaced apart locations around their periphery, the two layers are provided with ear like projections which provide means for anchoring the device when inflated. The edges of the two layers are brought together and heat-sealed by suitable means, except

2 for the outer edges of the overlapped tongue-like stem members. Thus, an opening is formed at the ends of the stem members through which a cooking container can be passed. When the device is inflated and oriented to receive the sun's rays, and a cooking container is in place inside the envelope, the inflated device can be secured in place by strings that extend from the peripheral ears to anchoring means such as simple stakes in the surrounding ground.

Other objects, advantages and features of the invention will become apparent from the following detailed description in conjunction with the accompanying drawing.

BRIEF DESCRIPTION OF THE DRAWING

FIG. 1 is a plan view of a flexible solar oven device according to the invention before it is inflated.

FIG. 1A is a view in perspective of the uninflated solar oven device of FIG. 1 with a portion broken away to show the bottom sheet of material having a reflective layer.

FIG. 2 is an enlarged fragmentary view in section taken along line 2—2 of FIG. 1.

FIG. 3 is a view in perspective showing the solar oven of FIG. 1 after it has been inflated and in use.

FIG. 4 is an enlarged fragmentary view in perspective showing the oven of FIG. 1 with its stem portion open for inserting and removing a cooking utensil.

DETAILED DESCRIPTION OF EMBODIMENT

With reference to the drawing, FIGS. 1 and 1A show a flexible, inflatable solar cooking device 10 as it appears in a flat, uninflated condition when not in use, and FIG. 3 shows it when it is inflated and positioned to receive the sun's rays to heat food or water within a container 12 situated within the device.

Generally, the solar device 10 comprises a rear sheet 14 of flexible material and a front sheet 16 which are sealed together along their edges and shaped to form a body portion 18 and a stem portion 20. The body portion has a generally circular or slightly oval configuration so that when inflated, the body portion 18 assumes a generally spherical shape.

As shown in FIGS. 2 and 3, the rear sheet 14 is a flexible base layer of plastic material having an attached layer on its underside of highly reflective material 22. We have found that the base layer 14 may be either clear polyester or nylon having an approximate thickness of 100 gauge or 25 microns (one mil) which includes the reflective material covering its bottom side. This sheet material provides adequate strength, durability and a high degree of reflectivity. On the upper side of the rear sheet 14 is a layer of heat sealable material 24 which may be polyethylene. This heat sealable material may be sprayed on the base layer 14 and may be confined to the edges thereof in order to form a bond with the front sheet 16.

The front sheet 16 is clear and may be made of clear plastic sheet material such as clear polyester or nylon again having a thickness of around one mil. This front sheet has a thin bottom layer 25 of polyethylene which also can be confined to its edges.

To form the body of the solar oven, the front sheet 16 is attached to the rear sheet 14 along the edges by a heat sealed line or bead 26. This heat sealing can be accomplished using known methods and apparatus, such as a heated die applied with pressure that welds the two contacting polyethylene layers 24 and 25 together. A similar procedure for forming a balloon is described in U.S. Pat. No. 4,917,646. In the present invention, the sealing bead 26 extends around the body which has a generally circular configuration. Spaced apart at intervals along the outer edge of the body are a series of ear-like projections 28, each having a hole 30 through a flexible line or rope 32 can be attached for securing the inflated solar oven 10 in place.

Stem portions 34 and 36 extend from the rear and front sheets 14 and 16 respectively, as shown in FIG. 1A to form an opening 38 into the solar oven. This opening is used for filling the body with air after a cooking receptacle 12 or pot to be heated has been placed into the inflated body which is ready to be heated. The sealing bead 26 continues from the periphery of the body and at least partially out the sides of the overlapped stem portions. The stem portions are relatively wide so as to provide a large enough opening 38 to allow a cooking receptacle to be passed therethrough. Once the receptacle is in place within the oven, and the oven is inflated, the stem portions 34 and 36 may be rolled up to close the opening. The stem portions can then be retained by suitable means such as common clothespins 42.

In the embodiment just described, the rear sheet 14 with its reflective coating 22 and the front clear sheet 16 are initially flat when the bead 26 is formed to provide a peripheral seal. It has been found that when this configuration is inflated, the rear sheet 14 forms a generally semispherical surface with the coating 22 serving to reflect sunlight toward a center area within the inflated body, where the cooking or water heating receptacle 12 is situated. When not in use, the flexible oven 10 can be folded into a relatively small, light package which is easily carried by a hiker or backpacker. Upon arrival at a location where the solar oven is to be used, it is unwrapped as shown in FIG. 1A, with its stem portions 34 and 36 open so that the cooking or heating receptacle 12 can be moved into place within the body. Thereafter, air can be allowed to flow into and inflate the body portion 18. The stem portions 34 and 36 can then be rolled up and pinned to retain the oven in its inflated condition. Within the reflected surface oriented in the optimum location to receive the sun's rays, the various lines 32 from the peripheral ears 28 are drawn tight and anchored as by tent pins in the surrounding ground. The heating of the contents within the cooking receptacle can be observed through the front clear sheet 16, and the receptacle can easily be removed through the stem opening when ready.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A method for heating food or water using solar energy comprising the steps of:

forming an envelope body from first and second sheets of flexible material, said first sheet comprising clear plastic material and said second sheet comprising plastic material having a reflective coating, said sheets being generally circular in shape, with radially extending and overlapping stem portions and being sealed along their peripheral edges including a portion of said stem portions which thereby form a temporary access opening into said envelope body;

inflating said envelope body with air to form a generally spherical shape so that said second reflective sheet forms a concave surface within said body that directs solar energy toward the central space of the inflated body;

placing a container with food or water through said access opening formed by said stem portions and thereafter folding said stem portions to close said opening and thereby retain air within said body;

positioning said inflated body so that solar rays are reflected from said reflective layer of said second sheet onto said food or water container within said body; and securing said inflated body in its selected position by to anchoring means in the surrounding ground area.

2. An envelope body which is inflatable to form an air-tight enclosure for use as a solar oven, said body comprising:

a rear sheet of flexible material having a reflective surface on the inside of said enclosure;

a front sheet of clear plastic material covering said reflective surface and connected along its outer edges to said rear sheet to form said envelope body;

overlapping stem portions having side edges that substantially coincide and forming an appendage that extends radially from said rear and front sheets to provide a tunnel-like opening for said body, said opening being wide enough to allow for the passing of a cooking or water-heating vessel into the interior of said envelope body and being closeable thereafter at its outer end to maintain the inflation of said enclosure;

sealing bead means formed by the connection of said front and rear sheets extending from said side edges of said stem portions around the periphery of said envelope body to form said enclosure;

whereby when air is forced through said opening, said rear and front sheets flex to form an inflated, generally spherical enclosure with an internal concave reflective surface being formed by said rear sheet which functions to direct the sun's rays toward a central location within the enclosure.

3. The solar oven of claim 2 wherein said rear sheet is comprised of an outer layer of material having said metallic reflective surface, a clear plastic backing covering said metallic surface and a clear heat sealable coating said backing.

4. The solar oven of claim 3 wherein said plastic backing is polyester sheet material.

5. The solar oven of claim 3 wherein said heat sealable material is polyethylene.

6. The solar oven of claim 3 wherein said first sheet has a thickness of around 1 mil and said clear sheet has a thickness of 1 mil.

7. The solar oven of claim 2 including a plurality of integral ear-like projections extending at predetermined locations from the periphery of the connected edges of said sheets.

8. The solar oven of claim 2 wherein said stem portions have a width of at least 15 inches and are heat sealed together at their edges near the periphery of said edge connected sheets.

* * * * *